UNITED STATES PATENT OFFICE.

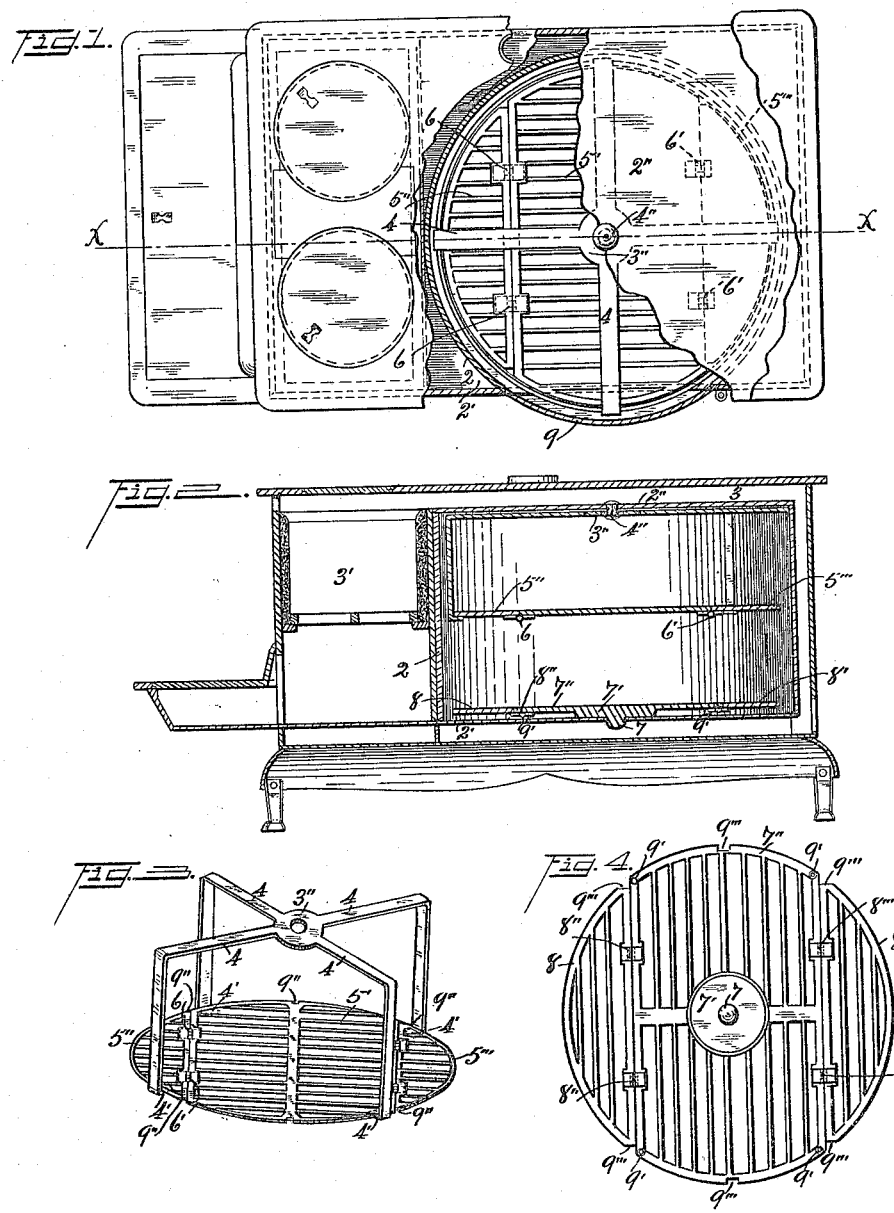

CHARLES B. GOLDSMITH, OF OAKVILLE, CONNECTICUT.

BAKING-OVEN.

1,136,120. Specification of Letters Patent. Patented Apr. 20, 1915.

Application filed April 16, 1914. Serial No. 832,171.

*To all whom it may concern:*

Be it known that I, CHARLES B. GOLDSMITH, a citizen of the United States, and a resident of Oakville, in the county of New Haven and State of Connecticut, have invented certain new and useful Improvements in Baking-Ovens, which improvements are fully set forth in the following specification.

This invention relates to improvements in compartments of that class capable of being subjected to the action of heat and quite generally availed of for the purpose of cooking various articles of food, such compartments being commonly known as baking ovens.

The object of this invention is to provide a baking oven which shall be simple and inexpensive as regards its construction; durable, efficient and reliable in practical service; which shall markedly facilitate the operation of reversing a disk, or the like, when placed therein, and as occasion may make needful or desirable and which shall possess certain well-defined advantages over prior analogous constructions.

The invention consists in certain combinations, details and parts whereby, together with the novel disposition and relative arrangement of said parts, the attainment of the foregoing object is rendered practicable, all of which will be hereinafter more particularly referred to and set forth in the appended claims.

The invention is clearly illustrated in the accompanying drawing, wherein—

Figure 1 is a plan view of a baking oven embodying my said improvements, the same being shown in this instance as applied to a cooking range of a general and well-known type. Fig. 2 is a vertical, longitudinal section thereof and of the range shown in conjunction therewith, the section being taken as along the broken line x—x of Fig. 1. Fig. 3 is a view showing in perspective and detached the grate supporting carrier which I make use of within my improved oven. Fig. 4 is a view showing in bottom plan and detached the sub-grate which I make use of.

Having reference to the accompanying drawing, wherein similar reference-characters denote like parts throughout the respective views, I, in carrying out my invention, make use of a general wall 2, which rises from a suitable base, as 2', and is approximately circular in horizontal section. The wall 2 is provided at its top with a flat closure-member 2'', which may take the form of the usual oven crown-sheet of a stove or range, and forms therewith, and with the base 2', my improved oven proper. At one side of the wall 2 a suitable opening is left by way of which access to the interior of the oven proper may be had, and said opening may be controlled by a suitable door in the usual manner.

My improved oven proper, particularly when applied to an ordinary stove or range, is well surrounded, in practically all directions, by an open space 3, for the circulation of heated air, as from the fire-box 3', all as in common practice.

Within my improved oven proper there is suspended, for rotative action horizontally, a grate-supporting carrier, here shown as comprising a center-piece 3'', from which radiate a plurality of arms 4, duly turned downwardly and terminating, respectively in a plurality of inturned feet 4', one for each of said arms. The carrier aforenamed operates solely on a pivot 4'', passing vertically through the center-piece 3'' and the top closure-member 2'', as clearly shown in the drawing, said carrier, accordingly, being suspended within the oven proper through the medium of said pivot, as will be clearly understood.

On the feet 4' there is removably positioned a super-grate, which comprises, by preference, a plurality of sections, as the medial section 5' and the opposite, minor sections 5'', 5''', said minor sections being hinged, or similarly attached, as at the points 6, 6', respectively, to the medial section 5', at the opposite sides thereof, whereby said super-grate may be folded into a compact form permitting its passage into place and out of place, relatively to the feet 4', particularly between such opposite downturned portions of the arms 4 as may constitute a pair thereof. I further provide a sub-grate, having a depending, central arbor 7, preferably surrounded by a boss 7', the arbor 7 operating in a suitable opening formed as in the base 2'. Said sub-grate comprises, by preference, a plurality of sections, as the medial section 7'' and the opposite minor sections 8, 8', said minor sections being hinged, or similarly attached, as at the points 8'', 8''', respectively, to the medial section 7'', at the opposite sides thereof, whereby said sub-grate may be folded into a form sufficiently compact to permit its passage through the opening aforenamed by way of which access is had to the interior of the oven proper. The constituent sections of each of the respective grates aforenamed may be formed from thin material, as metal, solid and in sheet-form, as indicated in section in Figs. 1 and 2, or same may be provided with suitable openings, as clearly indicated in Figs. 3 and 4. The position of each of the grates aforenamed, relatively to the base of my improved oven, is preferably such that same will marginally intersect and project forwardly beyond, the plane of the general front wall of the stove or range to which my improved oven may be applied, such wall being swollen, as at 9, to provide due clearance for such forwardly projecting margin of said grate, and wherein is arranged the opening aforenamed by way of which access is had to the interior of the oven. Hence, when a dish or the like, with its contents, if any, is placed on either of the grates aforenamed, the same may, simply by rotating such grate, be shifted in its position relatively to the fire-box 3', being brought adjacent thereto, or removed therefrom, as found desirable in practice; or brought to the opening last referred to where, by reason of the grate supporting such dish, or the like, projecting forwardly beyond the plane of the adjacent general wall, aforenamed, of the stove, range, or the like, the same may be very conveniently attended to, as occasion may make needful or desirable. When deemed advisable the sub-grate aforenamed may be provided with depending studs, as 9', the free end of each of which lies in close proximity to the base 2', said studs, in addition to the boss 7', serving to obviate undue canting of said grate.

It will be observed that the upstanding wall of my improved oven conforms approximately to the general, peripheral contour of the grate or grates which I make use of, this being important for the reason that a dish or the like, when placed on said grate, may not be displaced thereon by coming into engagement of any portion of said wall, and as would be the case were such upstanding wall given a more or less angular form in horizontal section.

The grates aforenamed are each provided with a series of peripheral notches, as 9'', 9''', respectively, provided to receive the end of a suitable device, as any of many common and well-known stove or range accessories, and whereby the turning of said grate may be facilitated; it being understood that said super-grate is cradled in and turns with the carrier aforenamed, while the sub-grate aforenamed turns mainly on the boss 7', and is controlled in its turning action by the arbor 7.

The operation of my improved oven will be apparent from the foregoing description thereof; and it will be seen that same is not only well adapted for the purposes for which it is intended, but may be modified to some extent, without departing from the scope of the claims hereto appended.

I claim:

1. A baking oven having upstanding side-walls approximately circular in horizontal section and a top-closure; a skeleton carrier disposed to rotate in an invariable, horizontal plane only within said oven, supported only at, and depending from the top thereof, and provided at its lower portion with a plurality of inturned feet; and a sectional grate, the latter freely positioned marginally on the feet aforenamed.

2. A baking oven having suitable upstanding side-walls and a top-closure; a pivot engaging centrally and only said top-closure; a carrier supported solely by said pivot, rotatable relatively thereto in an invariable horizontal plane only, and having its axis of rotative movement determined solely thereby, said carrier consisting of a center-piece having arms radiating therefrom in more than two different directions, and turned downwardly and terminating in a plurality of inturned feet, one for each of the arms aforenamed, and a grate, the latter contractible in face area to pass between the arms aforenamed comprised in any appropriate pair thereof, and expansible in face area to marginally and freely seat on the feet aforenamed.

3. A baking oven having upstanding side-walls approximately circular in horizontal section and a top-closure; a pivot engaging centrally and only said top-closure; a carrier supported solely by said pivot, rotatable relatively thereto in an invariably horizontal plane only, and having its axis of rotative movement determined solely thereby, said carrier consisting of a center-piece having arms radiating therefrom in more than two different directions, and turned downwardly and terminating in a plurality of inturned feet, one for each of the arms aforenamed, and a grate, the latter comprising a plurality of hingedly connected sections, whereby said grate may be contracted in face area for passage between the arms aforenamed comprised in any appropriate pair thereof, and expanded in face area to marginally and freely seat on the feet aforenamed.

CHARLES B. GOLDSMITH.

Witnesses:
 JAMES T. BRAYTON,
 ETHEL M. HANCHETT.